(12) United States Patent
Hoshino

(10) Patent No.: US 6,759,642 B2  
(45) Date of Patent: Jul. 6, 2004

(54) IMAGE PICK-UP DEVICE, CAMERA MODULE AND CAMERA SYSTEM

(75) Inventor: Kazuhiro Hoshino, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/767,922

(22) Filed: Jan. 23, 2001

(65) Prior Publication Data

US 2001/0030276 A1 Oct. 18, 2001

(30) Foreign Application Priority Data

Jan. 21, 2000 (JP) .................................. P2000-012401

(51) Int. Cl.[7] ............................................. H01L 27/00

(52) U.S. Cl. .................................. 250/208.1; 348/482

(58) Field of Search .............................. 350/208.1, 239, 350/216, 214.1; 358/482, 483; 359/219; 438/60, 64, 116

(56) References Cited

U.S. PATENT DOCUMENTS

| | | | | |
|---|---|---|---|---|
| 4,418,284 A | * | 11/1983 | Ogawa et al. | 250/578 |
| 4,523,102 A | * | 6/1985 | Kazufumi et al. | 250/578 |
| 5,138,145 A | * | 8/1992 | Nakamura et al. | 250/208.1 |
| 5,867,368 A | * | 2/1999 | Glenn | 174/52.2 |
| 6,172,361 B1 | * | 1/2001 | Holberg et al. | 250/239 |
| 6,266,197 B1 | * | 7/2001 | Glenn et al. | 359/819 |
| 6,342,406 B1 | * | 1/2002 | Glenn et al. | 438/57 |

* cited by examiner

Primary Examiner—Stephone B. Allen  
(74) Attorney, Agent, or Firm—Sonnenschein, Nath & Rosenthal LLP

(57) ABSTRACT

A camera module including a light-transmissible board having an infrared rays cutting function on one surface of which a wiring pattern is formed, an image pickup element having a photodetecting portion which is flip-chip-mounted on the same surface of the light-transmissible board while the photodetecting portion is opposite to an area where there is no wiring-pattern, and a lens unit which is mounted on the other surface of the light-transmissible board so as to be located above the photodetecting portion of the image pickup element.

5 Claims, 3 Drawing Sheets

IMAGE PICK-UP DEVICE, CAMERA
MODULE AND CAMERA SYSTEM

BACKGROUND OF THE INVENTION

1. Field of the Invention

The present invention relates to an image pickup device, a camera module and a camera system.

2. Description of the Related Art

A camera module using an image pickup device has been recently required to be installed in a camera system containing a signal processing system in a compact information terminal such as a personal computer, a portable videophone, etc., and in order to satisfy this requirement, the camera module has been increasingly and strongly required to be designed in a compact size.

FIG. 6 shows one of conventional camera modules each using an image pickup device such as a CCD image pickup device, a CMOS image pickup device or the like. A camera module 51 shown in FIG. 6 comprises an image pickup device 52, a mounting board 53 and a lens unit 54. The image pickup device 52 is designed in a QFP (Quad Flat Package) type structure in which a chip-type image pickup device 55 is mounted in a package body 56 and hermetically sealed with seal glass 57. The image pickup device 52 is mounted on the mounting board 53 through external connecting lead terminals 58 provided at the four sides of the package body 56. The lens unit 54 is mounted at the upper portion of the image pickup device 52. The lens unit 54 comprises a holder 59, a mirror barrel 60, an optical filter 61 and a lens 62.

The thickness of the conventional module 51 is equal to the total thickness of the image pickup device 52, the mounting board 53, and the lens unit 54 which constitute the camera module 51. Therefore, in order to manufacture a low-profile camera module 51 (i.e., a camera module having a small thickness), it is necessary to reduce the thickness of each constituent part.

Under the present condition, the upper limit of reducing the thickness of each of the image pickup device 52, the mounting board 53 and the lens unit 54 is about to be reached.

SUMMARY OF THE INVENTION

Therefore, according to an aspect of the present invention, there is provided an image pickup device including: a light-transmissible board having a wiring pattern formed on one surface thereof and containing an optical filter; and an image pickup element having a photodetecting portion formed on one surface thereof, the image pickup element being mounted on the one surface of the light-transmissible board in a flip-chip style so that the photodetecting portion of the image pickup element is opposed to an area where the wiring pattern is unformed.

In the image pickup device thus constructed, the image pickup device is mounted in the flip-chip style on one surface of the light-transmissible board on which the wiring pattern is formed, thereby reducing the overall thickness of the image pickup device. Further, the light-transmissible board is provided with an optical filter function (for example, an infrared ray cutting function). Therefore, when a lens unit is mounted on the other surface of the light-transmissible board to fabricate a camera module, it is unnecessary to install an optical filter board in the lens unit.

According to another aspect of the present invention, there is provided a camera module which includes: a light-transmissible board having a wiring pattern formed on one surface thereof and containing an optical filter, an image pickup element having a photodetecting portion formed on one surface thereof, the image pickup element being mounted on the one surface of the light-transmissible board in a flip-chip style so that the photodetecting portion of the image pickup element is opposite an area where no circuit pattern is formed; and a lens unit mounted on the other surface of the light-transmissible board so as to be located above the photodetecting portion of the image pickup element.

Further, according to another aspect of the present invention, there is provided a camera system using the camera module having the above construction.

In the camera module thus constructed, and the camera system using the camera module, the image pickup element is mounted in the flip-chip style on the surface of the light-transmissible board on which the wiring pattern is formed, and the lens unit is mounted on the opposite surface of the light-transmissible board. Thus, the thickness of the image pickup device can be reduced to be less than that of the conventional module structure by the amount corresponding to the thickness of the package, to hermetically seal the image pickup element. Further, the constituent parts (the light-transmissible board, the image pickup element and the lens unit) constituting the image pickup device can be arranged densely in the thickness direction of the module.

DETAILED DESCRIPTION OF THE
PREFERRED EMBODIMENTS

Preferred embodiments according to the present invention will be described hereunder with reference to the accompanying drawings.

Figure 1:
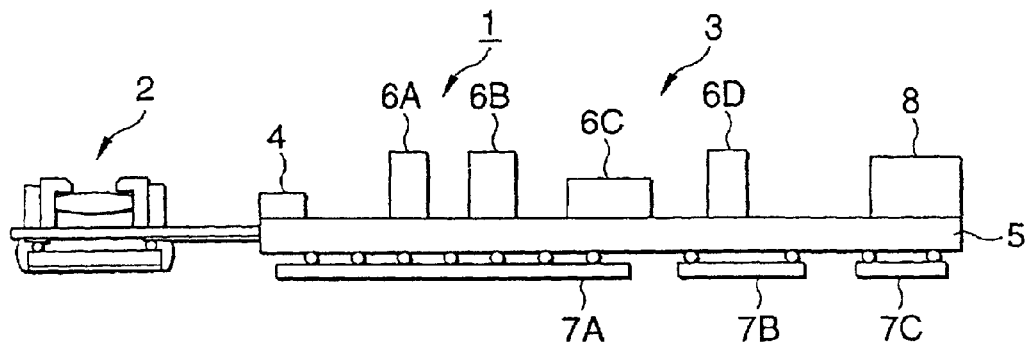
FIG. 1 is a side view showing the construction of a camera system according to the present invention.

FIG. 1 is a side view showing the construction of a camera system according to the present invention. The camera system shown in FIG. 1 comprises a camera module 2 and a system module 3. The camera module 2 and the system module 3 are connected through a connector 4.

Various electronic parts 6A to 6D and system ICs 7A to 7C, as well as the connector 4, are mounted on both sides of a wiring board 5 of the system module 3. The system ICs 7A to 7C are used to constitute a driving circuit for driving the camera module 2, an image processing circuit for performing various image processing (for example, image compression processing, etc.) on image signals obtained by the camera module 2, etc. On the wiring board 5 is mounted a USB (Universal-Serial-Bus) connector 8 for connecting the camera system 1 containing the system module 3 to an information terminal such as a personal computer or the like.

Figure 2:
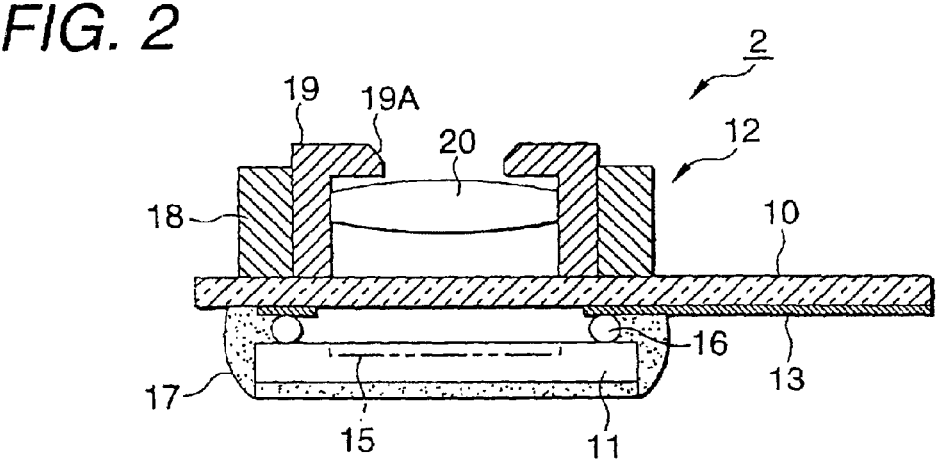
FIG. 2 is a diagram showing the construction of a camera module according to an embodiment of the present invention.
Figure 3:
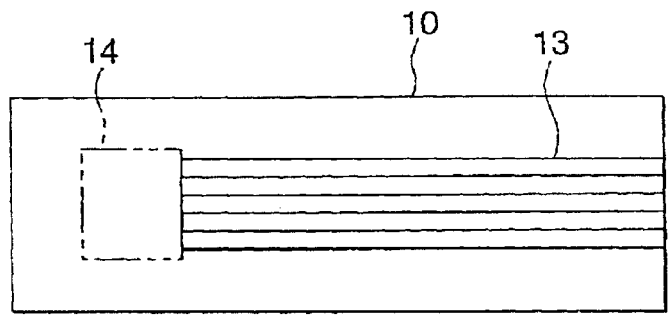
FIG. 3 is a plan view showing the board structure of the camera module of the embodiment of the present invention.

FIGS. 2 and 3 are diagrams showing the construction of a camera module according to an embodiment of the present invention, wherein FIG. 2 is a cross-sectional view showing the camera module and FIG. 3 is a plan view showing a light-transmissible board. The camera module 2 shown in FIG. 2 comprises a light-transmissible board 10, an image pickup element 11 and a lens unit 12. The light-transmissible board 10 and the image pickup element 11 constitute the image pickup device according to the present invention.

The light-transmissible board 10 is formed of a transparent glass board, for example, and a wiring pattern 13 is formed on the lower surface of the light-transmissible board 10. As shown in FIG. 3, the light-transmissible board 10 is designed to have a rectangular shape in the plan view. The light-transmissible board 10 has an infrared ray cutting function (IR cut function) due to a surface treatment such as coating, deposition or the like or due to an optical characteristic inherent to the board material itself. An element mounting area 14 on which the image pickup element 11 will be mounted is reserved at one side in the longitudinal direction of the light-transmissible board 10. The wiring pattern 13 is formed so as to extend from the element mounting area 14 to the other end in the longitudinal direction of the board.

The wiring pattern 13 is formed of conductive material such as Cu (copper), Al (aluminum) or the like by a patterning technique such as a plating method, an etching method, a printing method or the like. In the element mounting area 14 of the light-transmissible board 10, one end portion (land portion) of the wiring pattern 13 is arranged to match the electrode arrangement of the image pickup element 11 as described later. Further, the other end portion (land portion) of the wiring pattern is arranged to match the terminal arrangement of the above connector 4.

The image pickup element 11 is formed of a CCD image pickup device, a CMOS image pickup device or the like, and has a photodetecting portion 15 having many reading pixels arranged two-dimensionally on the principal surface of the image pickup element 11. Further, plural electrodes (not shown) formed of aluminum pads are arranged at a predetermined pitch at the peripheral edge portion of the image pickup element 11 so as to surround the photodetecting portion 15.

The image pickup element 11 is mounted on the lower surface of the light-transmissible board 10 through bumps 16 while it is kept as a bare chip (this mounting state will be referred to as "flip-chip-mounted"), whereby the electrode portion (not shown) of the image pickup element 11 and the wiring pattern of the light-transmissible board 10 are electrically connected to each other through the bumps 16. Under this mounting state, the image pickup element 11 is flip-chip-mounted on the lower surface of the light-transmissible board 10. Thus, the photodetecting portion 15 is opposite an area on which no wiring pattern 13 is formed (area where no circuit pattern is formed) so that light incident to the photodetecting portion 15 of the image pickup element 11 is not intercepted by the wiring pattern 13.

Further, resin 17 is coated over the overall peripheral edge portion of the image pickup element 11 so that the peripheral edge portion of the image pickup element 11 is sealed with no gap by the resin 17. The resin 17 is formed of glass epoxy resin or the like, and it is coated by using a dispenser or the like.

By sealing the peripheral edge portion of the image pickup element 11 with the resin 17, the mechanical strength of the electrical connection portion (bump joint portion) between the image pickup element 11 and the light-transmissible board 10 can be enhanced, and dust can be prevented from invading into the gap therebetween.

The lens unit 12 comprises a holder 18, a mirror barrel 19 and a lens 20. The lens unit 12 is mounted on the upper surface of the light-transmissible board 10 so as to be located above the photodetecting portion 15 of the image pickup element 11.

The holder 18 of the constituent parts of the lens unit 12 is designed in a cylindrical structure, and the mirror barrel 19 is fitted to the inner peripheral side of the holder 18. The inner peripheral surface of the holder 18 and the outer peripheral surface of the mirror barrel 19 are threaded as occasion demands. If the mirror barrel 19 is threaded into the holder 18, both the mirror barrel 19 and the holder 18 are relatively moved in the central axis direction (optical axis direction) to perform a focusing operation. The tip portion of the mirror barrel 19 is bent substantially perpendicularly toward the center axis, thereby forming a diaphragm portion 19A for regulating the incident light integrally with the mirror barrel 19.

The lens 20 is used to focus the light incident through the diaphragm portion 19A to the photodetecting portion 15 of the image pickup element 11. The lens 20 is secured to the interior of the mirror barrel 19 after being positioned with respect to the diaphragm portion 19A. In the mounting of the lens unit 12 on the light-transmissible board 10, the lens 20 is disposed so as to face the photodetecting portion 15 of the image pickup element 11 through the light-transmissible board 10.

In the camera module 2 thus constructed, the light incident through the diaphragm portion 19A of the lens unit 12 is focused to the photodetecting portion 15 of the image pickup element 11, due to the refractive action of the lens 20. During this process, light components of the infrared region (infrared rays) are removed from the light transmitted through the lens 20 by the infrared ray cutting function of the light-transmissible board 10 when passing through the light-transmissible board 10. The removal of the light components of the infrared region can prevent both erroneous coloring and occurrence of smear when a high-brightness subject is subjected to an image pickup operation. Further, the light incident through the light-transmissible board 10 is detected by the photodetecting portion 15 of the image pickup element 11 and photoelectrically converted to image signals. The image signals thus obtained are transmitted to the system module 3 (see FIG. 1) through the wiring pattern 13 of the light-transmissible board 10.

Subsequently, a method of manufacturing a camera module according to an embodiment of the present invention will be described with reference to FIGS. 4A to 4D.

Figure 4A:
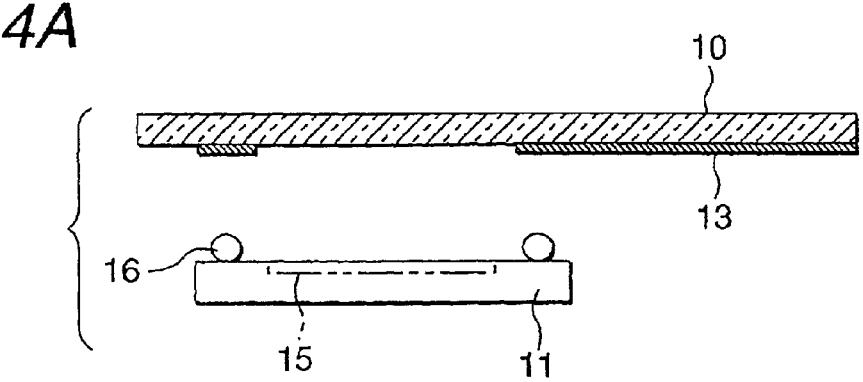
FIGS. 4A to 4D are diagrams showing a method of manufacturing the camera module of the embodiment of the present invention.

First, as shown in FIG. 4A, a wiring pattern 13 is formed on a 1 mm-thickness light-transmissible board having the infrared ray cutting function, and a bump 16 is formed on each of electrode portions of an image pickup element 11.

Infrared ray cut glass articles put on the market by optical part makers, for example, HOYA:C5000, Asahi Glass: PF-606M3, Toshiba Glass: CF-50 or the like, may be used for the light-transmissible board 10. These infrared rays cut glass articles are infrared rays absorption type filters and have a sufficient infrared ray cutting function in the range from 700 to 1200 nm.

Figure 5A:
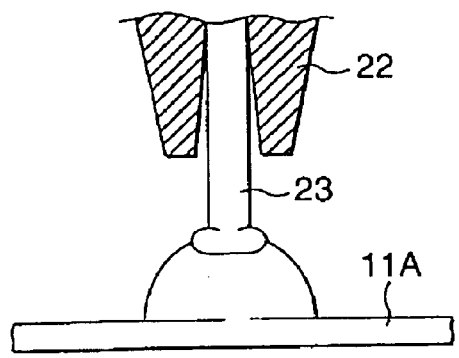
FIGS. 5A and 5B are diagrams showing an example of a bump forming method.
Figure 5B:
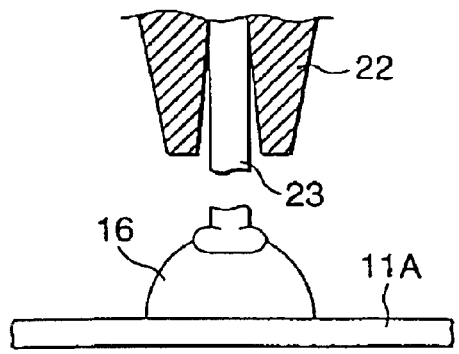

The bumps 16 are formed as follows. As shown in FIG. 5A, a ball is formed at the tip of a metal wire 23 drawn out from the tip of a capillary 22 and press-fitted to an electrode portion (aluminum pad) 11A of the image pickup element 11. Thereafter, as shown in FIG. 5B, the metal wire 23 is not drawn out from the capillary 22 and the metal wire 23 is cut at the ball side. This bump forming method is called a "ball bump method" or "stud bump method". In addition to this method, a bump forming method using an electroless plating method, a transfer bump method, or a bump forming method using soldering may be used.

Figure 4B:
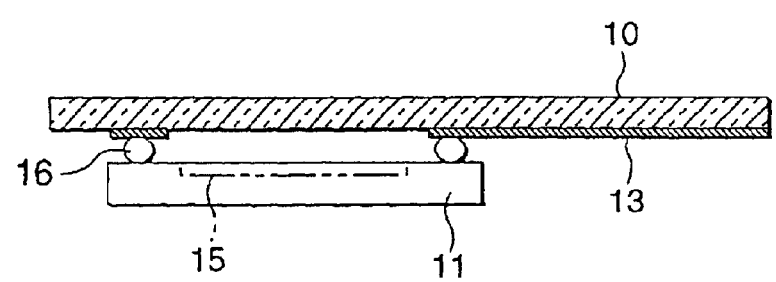

Subsequently, the image pickup element 11 is mounted on the lower surface of the light-transmissible board 10 via the bumps 16 (flip-chip mount) as shown in FIG. 4B. During this mounting step, the light-transmissible board 10 is put on a table (not shown), and the image pickup element 11 is fixed by a bonding tool (not shown). Thereafter, the bumps 16 formed on the electrode portions of the image pickup element 11 are electrically and mechanically bonded to the wiring pattern 13 of the light-transmission board 10 by ultrasonic bonding, while the light-transmission board 10 on the table and the image pickup element 11 are positioned by the bonding tool to each other.

The positioning of the light-transmissible board 10 and the image pickup element 11 is carried out by matching 1) the relative position between the element mounting area 14 of the light-transmissible board 10 and the photodetecting portion 15 of the image pickup element 11, and 2) the relative position between the wiring pattern 13 of the light-transmissible board 10 and the corresponding electrode portions of the image pickup element 11, in the direction (generally, horizontal direction) perpendicular to the direction of pressure of the bonding tool, respectively. The ultrasonic bonding is carried out under the following conditions; frequency of 50 KHz; tool temperature of 100(C; table temperature of 100(C; bonding time of 0.5 second; tool pressure of 100 g per bump; and amplitude of 2.5(m.

Here, the heating temperature in the ultrasonic bonding step is preferably set to 170° C. or less, so that when a microlens is formed on the principal surface of the image pickup element 11, there is no risk that the microlens is thermally damaged. Any bonding method other than the above ultrasonic bonding method may be used as the bonding method in the step of mounting the image pickup element 11 on the light-transmissible board 10, if it can implement the low-temperature bonding treatment satisfying the above temperature condition (170° C. or less). Specifically, a bonding method using silver paste, indium or anisotropic conductive material may be used.

Figure 4C:
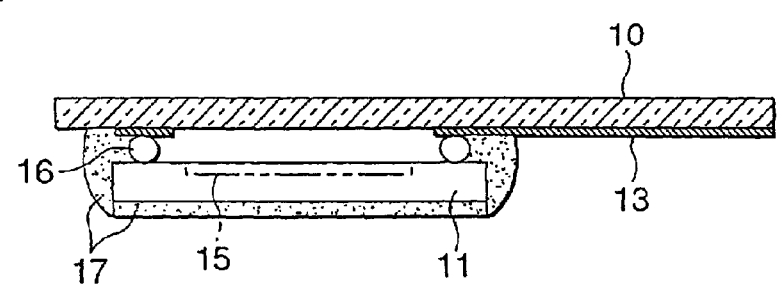

Subsequently, as shown in FIG. 4C, resin 17 is coated on the peripheral edge portion of the image pickup element 11 by using a dispenser or the like. After the resin 17 is coated, it is naturally dried or hardened by a thermal treatment (for example, for one hour at 120° C.). At this time, the resin 17 may be coated so as to cover not only the peripheral edge portion of the image pickup element 11, but also the back surface of the image pickup element 11. Further, the resin 17 having proper viscosity should be used to prevent the resin 17 coated by the dispenser or the like from flowing into the photodetecting portion 15 of the image pickup element 11.

Figure 4D:
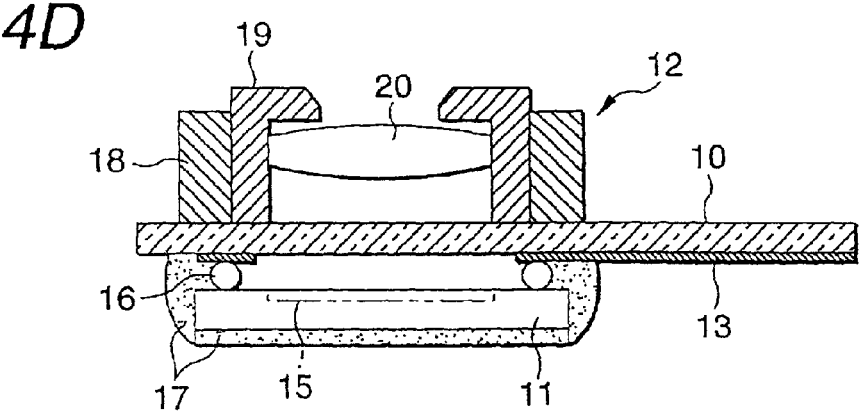

Subsequently, as shown in FIG. 4D, a lens unit 12 which has been fabricated in advance is mounted on the upper surface of the light-transmission board 10. In this mounting step, for example, adhesive agent of an epoxy group (not shown) is coated on the end face of the holder 18 of the lens unit 12 or the upper surface of the light-transmissible board 10 corresponding to the mounting position of the lens unit 12. Thereafter, the lens unit 12 is pressed against the upper surface of the light-transmissible board 10 under the state that the lens unit 12 and the image pickup element 11 are positioned to each other, thereby fixing the lens unit 12 to the light-transmissible board 10 through the adhesive agent.

In order to smoothly perform the positioning between the lens unit 12 and the image pickup element 11, a proper number of alignment marks may be provided on the upper surface or lower surface of the light-transmissible board 10. The alignment marks thus provided can be checked from the upper side and the lower side of the board by the characteristic (light transmission) of the light-transmissible board 10. Therefore, the positioning between the image pickup element 11 and the lens unit 12 is carried out with the alignment marks being used as points to match together, whereby the optical centers of the lens 20 and the photodetecting portion 15 can be made coincident with each other with high precision.

When the lens 20 is of a mono-focusing type, the lens unit 12 may be mounted while adjusting the position of the lens unit 20 in the optical axis direction (the up-and-down direction of FIG. 4D) and then fixed when the focusing point is achieved through image processing or the like. However, when a zoom lens is mounted, this adjustment is not required. Through the above process, the camera module 2 shown in FIG. 2 is achieved.

Figure 6:
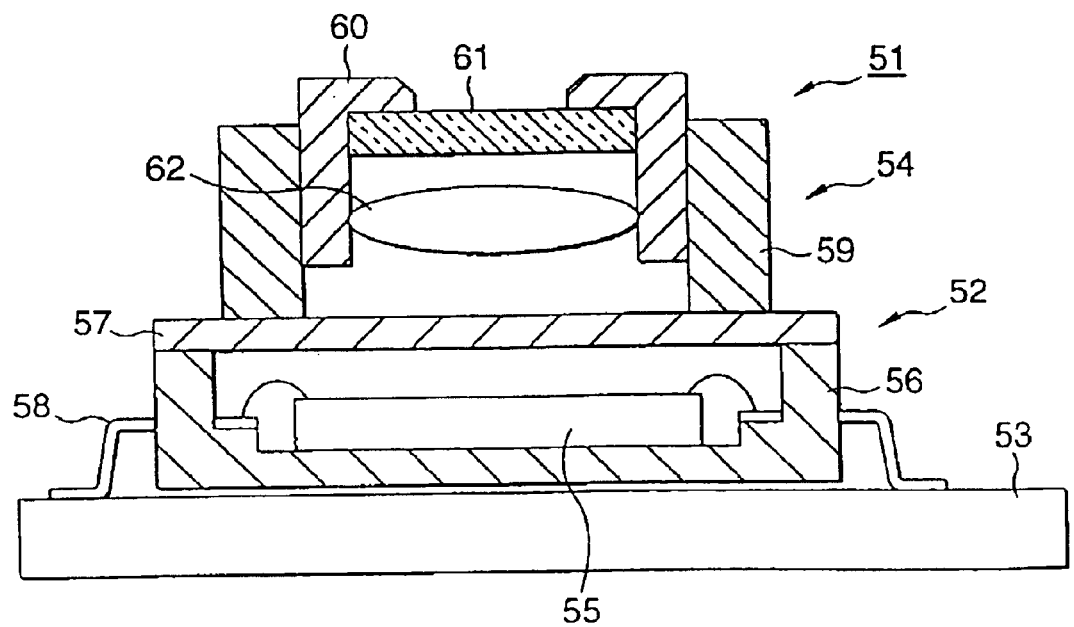
FIG. 6 is a cross-sectional view showing the structure of a conventional camera module.

Since the camera module thus constructed adopts such a structure that the image pickup element 11 is directly secured to the lower surface of the light-transmissible board 10, and the lens unit 12 is mounted on the upper surface, that is, the opposite side thereto of the light-transmissible board 10, the thickness of the camera module can be more greatly reduced as compared with the conventional module structure (see FIG. 6) by the thickness of the package for hermetically sealing the image pickup element, and also the light-transmissible board 10, the image pickup element 11 and the lens unit 12 can be more densely arranged along the direction of the thickness of the module. Further, since the light-transmissible board 10 having the infrared rays cutting function is adopted, it is unnecessary to install an optical filter for cutting infrared rays in the lens unit 12.

Accordingly, the ultra-thin type camera module can be achieved. Further, even the image pickup device which includes the combination of the light-transmissible board 10 and the image pickup element 11 can be designed to be thinner than the conventional image pickup device 52 (see FIG. 6). Still further, the camera system 1 using the camera module 2 can be installed in an information terminal by using a smaller securing space because the thickness of the camera module 2 is reduced.

In addition, since the number of parts of the lens unit 12 is reduced, the unit structure can be simplified and the producing time can be shortened. Further, when the camera module 2 is manufactured, the package step of hermetically sealing the image pickup element 11 is not required, and thus the productivity can be enhanced and thus the manufacturing cost can be reduced.

In the above-described embodiment, the light-transmissible board 10 having the infrared rays cutting function is used. However, the present invention is not limited to the above embodiment. For example, if the light-transmissible board 10 is provided with another optical filtering function such as an optical band-pass filter, only light components having specific wavelengths can be incident to the photodetecting portion 15 of the image pickup element 11 even when no filter board having the same function is installed in the lens unit 20.

Further, in the above-described embodiment, the wiring pattern 13 is formed on the light-transmissible board 10 of the camera module 2, and the wiring pattern 13 thus formed is connected to the connector 14 at the system module 3 side. However, in place of this arrangement, a flexible board or the like may be interposed between the camera module 2 and the system module 3 to electrically connect the camera module 2 and the system module 3.

As described above, according to the present invention, the image pickup element is flip-chip-mounted on the surface of the light-transmissible board on which the wiring pattern is formed, and the light-transmissible board is provided with the optical filtering function. Therefore, when the lens unit is mounted on the other surface of the light-transmissible board to fabricate the camera module, the thickness of the camera module can be more greatly reduced by the thickness of the package for hermetically sealing the image pickup element as compared with the conventional module structure. In addition, the light-transmissible board, the image pickup element and the lens unit can be more densely arranged in the thickness direction of the module. Further, even when no optical filter board is installed in the lens unit, desired wavelength light can be detected by the photodetecting portion of the image pickup element with the optical filtering function of the light-transmissible board. Accordingly, there can be provided an ultra-thin type camera module.

What is claimed is:

1. An image pickup device comprising:
    a light-transmissible board formed from a light transmitting material, said board having a wiring pattern formed on one surface thereof and containing an optical filter disposed thereon for filtering light transmitted through the light transmitting material of the board; and
    an image pickup element having a photodetecting portion formed on the same surface thereof, said image pickup element being mounted in flip-chip style on the one surface of said light-transmissible board so that the photodetecting portion of the image pickup element is opposed to an area where the wiring pattern is not formed;
    wherein said wiring pattern is configured to match an electrode arrangement of said image pickup element and a terminal arrangement of a connector.

2. The image pickup device as claimed in claim 1, wherein said optical filter is an infrared rays cutting filter.

3. The image pickup device as claimed in claim 1 wherein a peripheral edge portion of said image pickup element is sealed with resin.

4. A camera module comprising;
    a light-transmissible board formed from a light transmitting material having a wiring pattern formed on one surface thereof and containing an optical filter disposed thereon for filtering light transmitted through the light transmitting material of the board; and
    an image pickup element having a photodetecting portion formed on the same surface thereof; and
    a lens holder unit comprising a tens, said lens being mounted above the other surface of said light-transmissible board so as to be located above said photodetecting portion of said image pickup element, said image pickup element being mounted in a flip-chip style on the one surface of said light-transmissible board so that the photodetecting portion of the image pickup element it is opposed to an area where the wiring pattern is not formed;
    wherein said wiring pattern is configured to match an electrode arrangement of said image pickup element and a terminal arrangement of a connector.

5. A camera system using a camera module comprising:
    a light-transmissible board formed from a light transmitting material having a wiring pattern formed on one surface thereof and containing an optical filter disposed thereon for filtering light transmitted through the light transmitting material of the board; and
    an image pickup element having a photodetecting portion formed on the same surface thereof; and
    a lens holder unit comprising a lens, said lens being mounted above the other surface of said light-transmissible board so as to be located above said photodetecting portion of said image pickup element, said image pickup element being mounted in flip-chip style on the one surface of said light-transmissible board so that the photodetecting portion of the image pickup element is confronted to a wiring-pattern non-forming area;
    wherein said wiring pattern is configured to match an electrode arrangement of said image pickup element and a terminal arrangement of a connector.

* * * * *